United States Patent Office 3,250,644
Patented May 10, 1966

---

3,250,644
METHOD FOR REMOVING IMAGES FROM PRE-SENSITIZED LITHOGRAPHING PLATES
Sanford Marcus, New York, N.Y., assignor to Polychrome Corporation, Yonkers, N.Y., a corporation of New York
No Drawing. Filed Mar. 27, 1963, Ser. No. 268,455
3 Claims. (Cl. 134—41)

This application is a continuation-in-part of application Serial No. 724,496, filed March 28, 1958, now abandoned.

This invention relates to a method for removing the image from a presensitized metal-base lithographing plate.

Presensitized lithographing plates are plates in which the light-sensitive coating is exposed to light through a negative, and the image portion of the plate is hardened and made insoluble in water by the action of the light. The unexposed light-sensitive coating is then removed by a densensitizing solution leaving a water-receptive undercoating as the non-image area.

It has been known to use a flexible metallic sheet as the base material in a presensitized plate. Typical metals which may be used are aluminum, steel, zinc, magnesium, chromium and copper. Such plates are made permanently hydrophilic by treatment with an alkali metal silicate.

The silicate coating then provides an adhesive and water-receptive undercoating for the light-sensitive material. Details of the plate structure form no part of the present invention, and are more fully set forth in United States Patents Nos. 2,882,154 and 2,922,715, which are owned by applicant's assignee.

In accordance with the present invention, it has been found that the image on such plates may be readily removed in a manner which will not harm the metallic base and will allow the plate to be re-used. The removal of the image also becomes important where matters of security are involved, and these plates, when disposed of, should not be in condition where the image is still visible or at all recognizable.

Accordingly, it is an object of the present invention to provide an economical and effective method for removing the image from presensitized, metal-based lithographic plates.

This and other objects of the present invention will become more apparent from the following:

Essentially, the present invention involves the application to the plate of a solution consisting essentially of 85 to 97 percent acetone and 3 to 15 percent hydrofluoric acid (measured as commercial HF, i.e. a 70 percent aqueous solution). Obviously, the strength of the HF may be varied, and more dilute solutions will be operative, but somewhat less effective.

After the solution is applied to the plate by dipping or by means of a suitable applicator, the plate is allowed to set in contact with the solution for at least 15 seconds. It is then ready for wiping with an absorbent material such as cotton cloth. When wiped, the image comes off on the cloth and the plate is essentially clean.

The contact time between the solution and the plate generally varies between 15 and 60 seconds and in a specific embodiment of time of 30 seconds may be employed. The application of the image removing composition can readily take place at ambient temperature.

After the image is removed, the plate may be washed with water and then either discarded or prepared for re-coating with a silicate base and light-sensitive compound, e.g. a light-sensitive diazo compound.

*Specific example*

An aluminum offset plate 10 inches by 15 inches and .005 inch thick was provided with an alkali silicate coating and a light-sensitive diazo coating in the usual manner. The plate was imaged by exposure through a negative and several runs were made with the imaged plate. The plate was then washed with a solution consisting of 90 percent acetone and 10 percent commercial hydrofluoric acid (70 percent HF). After standing for 30 seconds in contact with this solution, the plate was wiped with a cotton cloth and the image was completely removed. The aluminum base was unharmed and the plate was then resilicated and resensitized, and was then suitable for further use.

In the foregoing, this invention has been described only in connection with preferred embodiments thereof. Many variations and modifications of the principles of this invention within the scope of the description herein are obvious. Accordingly, it is preferred to be bound not by the specific disclosure herein, but only by the appended claims.

The embodiments of the invention in which an exclusive privilege or property is claimed are defined as follows:

I claim:
1. A method for removing an exposed and developed diazo resin image from a lithographic plate constituted of a metallic substrate having an alkali metal silicate undercoating thereon, which comprises contacting said plate with a solution consisting essentially of 85 to 97% acetone and 3 to 15% hydrofluoric acid, and then wiping the diazo resin image from the plate with an absorbent material.

2. The method of claim 1, including the further steps of washing the plate with water, re-coating the metallic substrate with an alkali metal silicate coating, and re-sensitizing the same with a light-sensitive diazo resin.

3. A method for removing an exposed and developed diazo resin image from a lithographic plate constituted of an aluminum substrate having an alkali metal silicate undercoating thereon, which comprises contacting said plate with a solution consisting essentially of 85 to 97% acetone and 3 to 15% hydrofluoric acid, and then wiping the diazo resin image from the plate with an absorbent material.

References Cited by the Examiner
UNITED STATES PATENTS

| | | | |
|---|---|---|---|
| 716,977 | 12/1902 | Anderson | 156—22 X |
| 2,507,314 | 5/1950 | Mason | 101—149.2 |
| 2,558,013 | 6/1951 | Staubly et al. | 252—143 |
| 2,732,796 | 1/1956 | Van Dusen | 101—149.2 |
| 2,994,609 | 8/1961 | Landau | 96—33 X |
| 3,046,114 | 7/1962 | Sus | 96—49 X |

MORRIS O. WOLK, *Primary Examiner.*
J. ZATARGA, *Assistant Examiner.*